(12) United States Patent
Martin et al.

(10) Patent No.: US 7,794,625 B2
(45) Date of Patent: Sep. 14, 2010

(54) PREPARATION OF A COMPOSITION OF A SWELLING TOT-TOT INTERLAYER

(75) Inventors: Francois Martin, St Foy d'Aigrefeuille (FR); Jocelyne Ferret, Toulouse (FR); Cederic Lebre, Toulouse (FR); Sabine Petit, Bonneuil Matours (FR); Olivier Grauby, Auriol (FR); Jean-Pierre Bonino, Pechabou (FR); Didier Arseguel, Deyme (FR); Alain Decarreau, Poitier (FR); Eric Ferrage, Toulouse (FR)

(73) Assignees: Luzenac Europe SAS, Toulouse (FR); Centre National de la Recherche Scientifique (C.N.R.S), Paris (FR)

( * ) Notice: Subject to any disclaimer, the term of this patent is extended or adjusted under 35 U.S.C. 154(b) by 0 days.

(21) Appl. No.: 12/374,183

(22) PCT Filed: Jul. 13, 2007

(86) PCT No.: PCT/FR2007/001201

§ 371 (c)(1),
(2), (4) Date: Jan. 16, 2009

(87) PCT Pub. No.: WO2008/009800

PCT Pub. Date: Jan. 24, 2008

(65) Prior Publication Data

US 2009/0253569 A1    Oct. 8, 2009

(30) Foreign Application Priority Data

Jul. 17, 2006   (FR)   .................................. 06 06474

(51) Int. Cl.
*C04B 14/04*   (2006.01)
(52) U.S. Cl. ........................ 252/378 R; 501/2; 501/4; 501/12; 423/331
(58) Field of Classification Search ............. 252/378 R; 501/2, 4, 12; 423/331
See application file for complete search history.

(56) References Cited

U.S. PATENT DOCUMENTS 5,378,661 A * 1/1995 Reig et al. ..................... 501/2

OTHER PUBLICATIONS

Alain Decarreau et al., "Synthèse et stabilit des stèvensites kerolites et talcs, magnèsiens et nickelifères, entre 80 et 240° C.", C. R. ACAD. SCI. Paris, 1989, pp. 301-306, vol. 308, No. II, Acadèmie des Sciences.
F. Martin et al., "Experimental study of Si-Ge tetrahedral solid solution in Ni-Co-Mg talcs", Thin Solid Films, 1992, pp. 189-195, vol. 222, Elsevier Sequoia.
International Search Report, dated Dec. 28, 2007 and issued in corresponding International Patent Application No. PCT/FR2007/001201.

* cited by examiner

*Primary Examiner*—Timothy C Vanoy
*Assistant Examiner*—Michelle Hou
(74) *Attorney, Agent, or Firm*—Young & Thompson

(57) ABSTRACT

A method for preparing a composition including mineral particles, that is swelling TOT-TOT interlayer particles, formed by interlayering between: at least one non-swelling mineral phase formed by a stack of elementary laminae of the phyllogermanosilicate 2/1 type and of formula —$(Si_xGe_{1-x})_4 M_3O_{10}(OH)_2$—, and at least one swelling mineral phase formed by a stack of elementary laminae of the phyllogermanosilicate 2/1 type and at least one interlaminar space between two consecutive elementary laminae, the swelling mineral phase being of formula —$(Si_xGe_{1-x})_4M_{3-\epsilon}O_{10}(OH)_2, (M^{2+})\epsilon'.nH_2O$. The composition is prepared by subjecting a gel containing silicon, germanium and metal, of chemical formula —$(Si_xGe_{1-x})_4M_3O_{11}, nH_2O$—, in the liquid state to a hydrothermal treatment which is carried out over a defined period of time and at a temperature of between 150° C. and 300° C., the time and temperature being selected according to the desired structural characteristics for the swelling TOT-TOT interlayer particles to be prepared.

18 Claims, 7 Drawing Sheets

Figure 1:
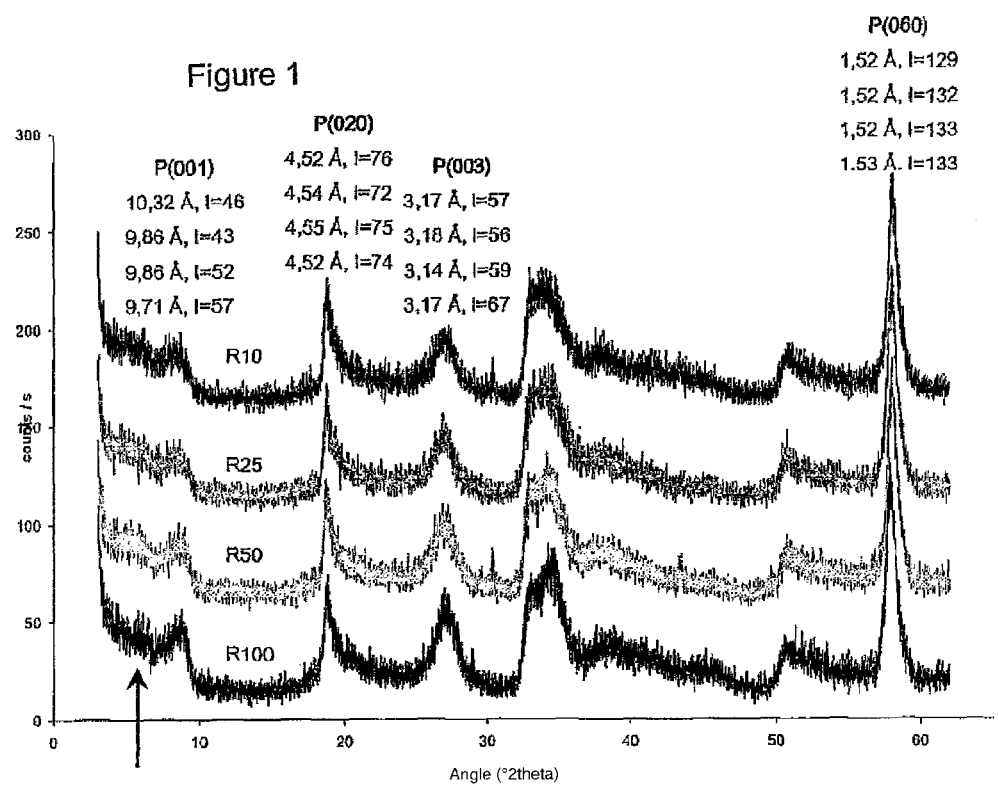
Figure 2A:
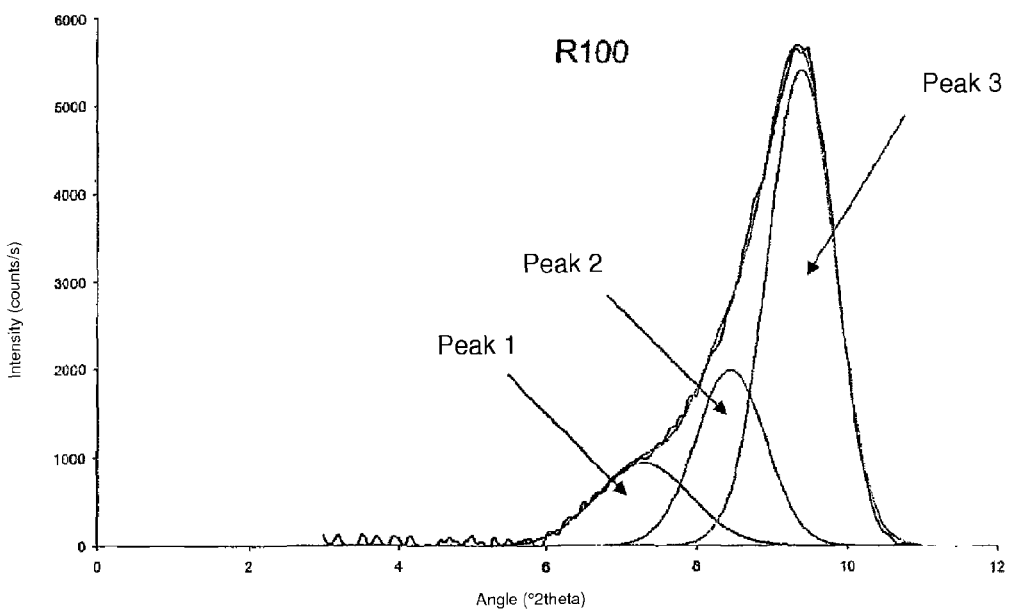

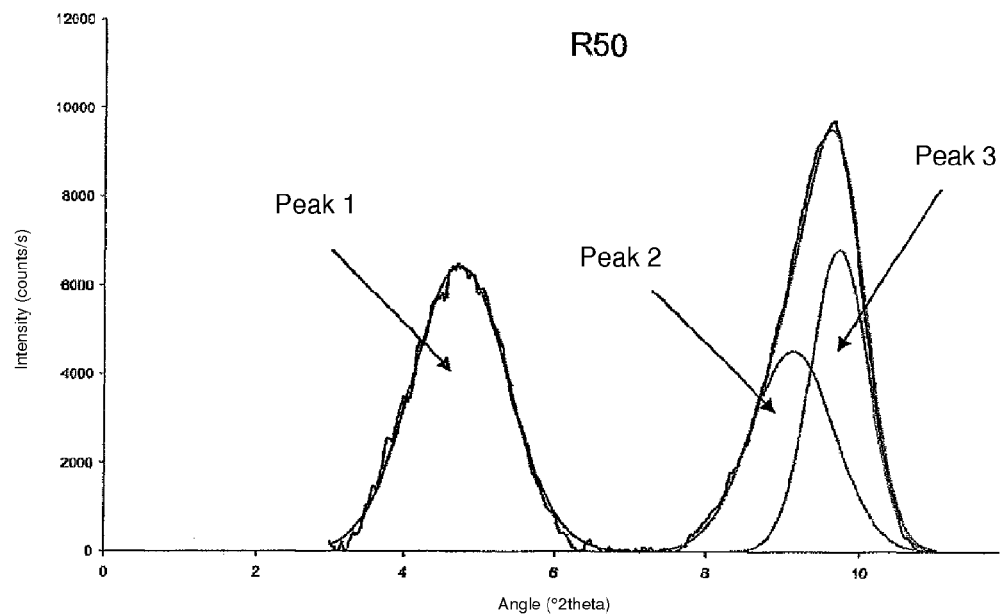
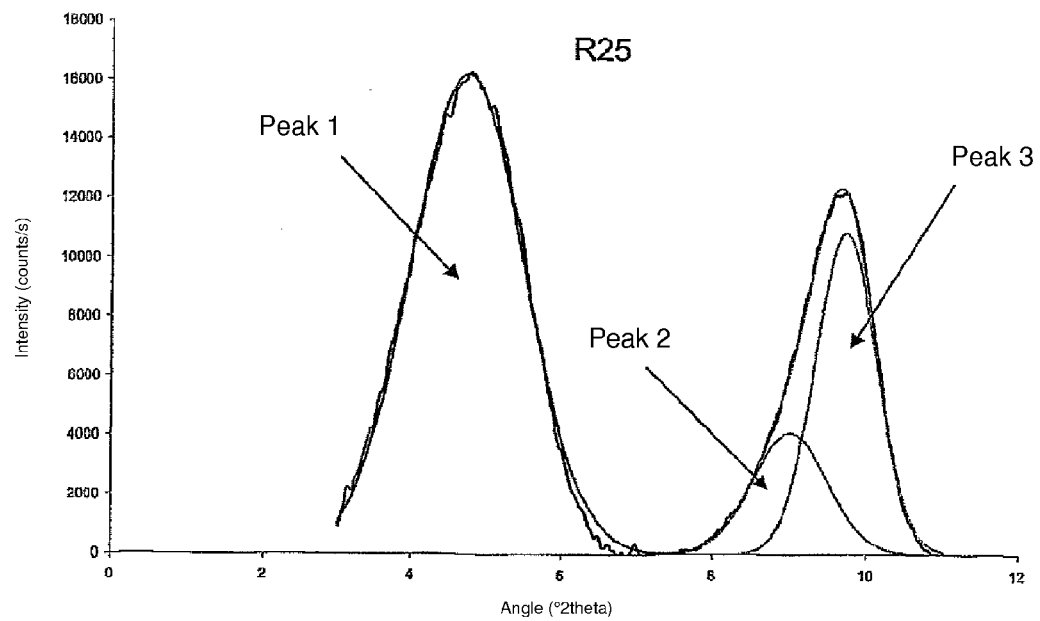

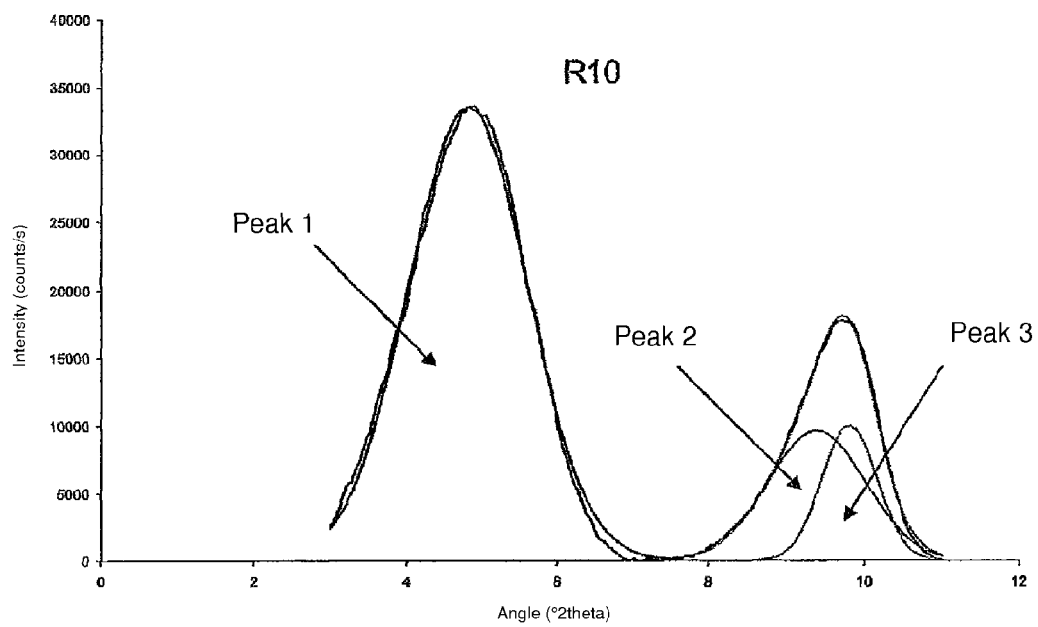

PREPARATION OF A COMPOSITION OF A SWELLING TOT-TOT INTERLAYER

The invention relates to a method for preparing compositions comprising a (2/1 phyllogermanosilicate)-(swelling phyllogermanosilicate) interlayer, that is swelling TOT-TOT interlayer compositions, which can be used especially as precursors for the preparation of compositions, that is talcose compositions, including synthetic talc compositions.

The smectites correspond to the most diversified group of the 2/1 argillaceous minerals. In view of their structure, they are described as the swelling TOT (tetrahedron-octahedron-tetrahedron) type.

They are in fact constituted by an irregular stack of elementary laminae of crystalline structure, the number of which varies from several units to several tens of units; each elementary lamina being constituted by the association of two layers of tetrahedrons located on either side of a layer of octahedrons.

The octahedral layer of smectites is formed by two planes of $O^{2-}$ and $OH^-$ ions (in the molar ratio $O^{2-}/OH^-$ of 2:1). On either side of this median layer there are arranged two-dimensional networks of tetrahedrons, of which one of the vertices is occupied by an oxygen of the octahedral layer while the three others are occupied by substantially coplanar oxygens. In natural smectites, the tetrahedral sites are generally occupied by $Si^{4+}$ or $Al^{3+}$ ions, and the octahedral sites are more often than not occupied by $Mg^{2+}$, $Fe^{2+}$, $Al^{3+}$ and/or $Fe^{3+}$ ions. A small proportion of the octahedral and/or tetrahedral sites is not occupied and is responsible for the cation deficit of the crystal lattice forming the elementary laminae.

Smectites are also characterized by the presence, between the elementary laminae, of interfoliar spaces which contain water and cations and which form the swelling phase of the mineral. In natural smectites, the interfoliar cations are generally $Mg^{2+}$, $Ca^{2+}$ and/or $Na^+$ ions.

Owing to this particular structure, smectites have the feature that they can readily form lamellar complexes with water and with many organic molecules, such as glycerol and ethylene glycol, which insert themselves into the interfoliar space. Likewise, the interfoliar cations are bonded weakly to the remainder of the lattice and are accordingly capable of being exchanged more or less readily with other cations. This is referred to as the cation exchange capacity of the mineral.

The invention aims to propose a method for preparing compositions comprising mineral particles which have a structure and a cation exchange capacity similar to those of natural smectites and whose structural characteristics, such as crystallinity and swelling phase/non-swelling mineral phase ratio, can be foreseeable and/or defined relatively precisely in view of the particular parameters applied during the implementation of said method.

The invention aims to propose such a method which is simple and rapid to carry out and which is compatible with the constraints of industrial use.

It is also an object of the present invention to propose a method which permits the preparation of a wide chemical variety of compositions comprising mineral particles whose structure and properties—especially whose cation exchange capacity—are similar to those of natural smectites and which, by conversion methods which are simple and rapid to carry out, can subsequently yield a wide variety of talcose compositions, that is to say compositions which are chemically and structurally very similar to natural talc compositions and optionally have particular properties which have been improved.

To that end, the invention relates to a method for preparing a composition comprising mineral particles, that is swelling TOT-TOT interlayer particles, formed by interlayering between:

at least one non-swelling mineral phase formed by a stack of elementary laminae of the 2/1 phyllogermanosilicate type and having the chemical formula —$(Si_xGe_{1-x})_4M_3O_{10}(OH)_2$— and at least one swelling mineral phase formed by a stack of elementary laminae of the 2/1 phyllogermanosilicate type and at least one interfoliar space between two consecutive elementary laminae; said swelling mineral phase having the chemical formula —$(Si_xGe_{1-x})_4M_{3\epsilon}O_{10}(OH)_2$, $(M^{2+})_{\epsilon'''}.nH_2O$—, in which chemical formulae:

M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1,$$

x is a real number of the interval [0; 1], $\epsilon$ and $\epsilon'$ relate to the cation deficit of the elementary laminae of the swelling phase and to the cations present in the interfoliar space(s), respectively, said composition having an X-ray diffractogram (obtained following X-ray diffraction analysis of said swelling TOT-TOT interlayer particles) comprising the following characteristic diffraction peaks:

a plane (001) located at a distance of the order of 14-15 Å, representing said swelling mineral phase, planes representing said non-swelling mineral phase:
a plane (001) located at a distance of the order of 9.60-10.50 Å;
a plane (020) located at 4.50-4.60 Å;
a plane (003) located at 3.10-3.20 Å;
a plane (060) located at 1.50-1.55 Å, which method comprises subjecting a gel containing silicon, germanium and metal and having the chemical formula —$(Si_xGe_{1-x})_4M_3O_{11}$,n'$H_2O$—, in the liquid state, to a hydrothermal treatment; said hydrothermal treatment is carried out for a period of time and at a temperature, of from 150° C. to 300° C., which are chosen according to the structural characteristics desired for said swelling TOT-TOT interlayer particles that are to be prepared; said hydrothermal treatment is carried out at a controlled pressure of the order of 16 bar and with stirring; for a given hydrothermal treatment temperature and time, additional water is added to said gel containing silicon, germanium and silicate in order to adjust the water/solid ratio representative of the reaction mixture based on gel containing silicon, germanium and metal that is to be treated, in dependence on the ratio by volume—swelling mineral phase/non-swelling mineral phase—desired for the swelling TOT-TOT interlayer particles that are to be prepared.

It is to be noted that the publication "Synthèse et stabilité des stévensites et talcs, magnésiens et nickelifères, entre 80 et 240° C.", A. Decarreau et al. XP008075903, describes a method with which different minerals, stevensites, kerolites and talcs can be prepared, the formation of each mineral being strictly dependent on the temperature. None of the minerals obtained by this method has a diffractogram comprising a diffraction peak for a plane (001) representing a swelling mineral phase, located at a distance of the order of 14 to 15 angstroms. This document does not describe swelling TOT-TOT interlayer compositions, nor does it describe a method by which such compositions can be obtained.

According to the invention, the starting material containing silicon, germanium and metal, which is subjected directly to the hydrothermal treatment, is in the form of a gel, that is to say a highly hydrated substance, having a gelatinous consistency. The gel exhibits thixotropic behavior and is rendered liquid by simple mechanical stirring.

In a method according to the invention, the supplementary addition of water also makes it possible to avoid calcination of the solid fraction (the starting gel, the final product, any intermediate products). The necessity of adding water in this manner and the minimum amount of water to be added in order to avoid calcination depend substantially on the degree of hydration of the starting gel, on the treatment temperature and on the treatment time. Nevertheless, the water/solid ratio chosen for carrying out the hydrothermal treatment is not unimportant; it affects some of the physicochemical and structural properties of the swelling TOT-TOT interlayer particles that will ultimately be obtained. In particular, that ratio has a significant effect on the crystallinity of the product and on the swelling mineral phase/non-swelling mineral phase ratio and therefore ultimately especially on the cation exchange capacity of the resulting product as well as on the ability of the product to be loaded with various molecules and substances.

The hydrothermal treatment time, which can range from one day to several days, has a considerable influence especially on the crystallinity of the synthetic mineral that is ultimately obtained.

Advantageously and according to the invention, the hydrothermal treatment of said gel containing silicon, germanium and metal is carried out by means of an autoclave. A steel autoclave with an inner lining of polytetrafluoroethylene (Teflon®), titanium or stainless steel is preferably used.

Advantageously and according to the invention, said hydrothermal treatment is carried out at a temperature of the order of 220° C. for a period of time of the order of 15 days. According to a variant, said hydrothermal treatment is carried out at a temperature of the order of 300° C. for a period of time of the order of 5 hours.

In order to carry out the hydrothermal treatment with stirring, it is possible, for example, to arrange a bar magnet inside the autoclave.

At the end of a hydrothermal treatment according to the invention there is obtained a synthetic mineral composition in the form of a colloidal solution containing said swelling TOT-TOT interlayer particles. The synthetic mineral particles, in solution in water, can either be in a state in which they are more or less individualized relative to one another or they are organized into more or less coarse aggregates formed of elementary swelling TOT-TOT interlayer particles which have combined with one another.

Advantageously and according to the invention, a colloidal composition is recovered at the end of the hydrothermal treatment, and said colloidal composition is subjected to a drying step followed by a mechanical grinding step to give a solid composition comprising individualized swelling TOT-TOT interlayer particles.

Advantageously and according to the invention, drying can be carried out by means of an oven; for example at a temperature of the order of 60° C. for at least one to two days. Grinding is advantageously carried out mechanically; for example using a mortar, preferably made of agate in order to avoid any risk of contamination of the mineral composition so prepared.

According to a particular embodiment of the invention, the starting gel containing silicon, germanium and metal is prepared by a coprecipitation reaction between:

a liquid composition comprising at least one saline solution selected from: a sodium metasilicate ($Na_2OSiO_2$) solution and a sodium metagermanate ($Na_2OGeO_2$) solution; the respective amounts of these two solutions are chosen to give a liquid composition having the following molar concentration ratios:

$$\frac{[Na_2OSiO_2]}{[Na_2OSiO_2]+[Na_2OGeO_2]} = x \text{ and}$$

$$\frac{[Na_2OGeO_2]}{[Na_2OSiO_2]+[Na_2OGeO_2]} = 1-x; \text{ and}$$

a solution of metal chloride(s) ($MCl_2$) comprising at least one divalent metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); with a molar concentration ratio for each of said metal chlorides such that:

$$\frac{[\text{divalent metal}]_{(i)}}{[M]_{(total)}} = y(i)$$

in the presence of a hydrochloric acid solution.

In so doing, the following chemical reaction is carried out:

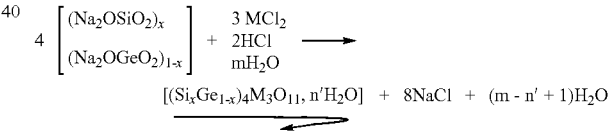

m, n' and (m−n'+1) being positive integers.

The preparation of this type of gel is well known and, by way of example, the instructions given in the publication Decarreau et al., 1989 ("Synthèse et stabilité des stévensites, kérolites et talcs, magnésiens et nickélifères, entre 80 et 240° C."—R. Acad. Scie. Paris —, t. 308, series II, p. 301-306) can be followed.

Advantageously and in practice, in order to prepare the gel containing silicon, germanium and metal of formula ($Si_x Ge_{1-x})_4M_3O_{11}$,n'$H_2O$, the following steps are carried out in succession:

an acidic composition of metal chloride ($MCl_2$,n$H_2O$) is prepared by dissolving, in one volume of water, an appropriate amount of a composition of hygroscopic crystals of at least one metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); then hydrochloric acid (HCl) is added thereto;

a liquid composition is prepared by dissolving, in an appropriate volume of water, an amount of at least one salt selected from: sodium metasilicate and sodium metagermanate;

the two aqueous compositions are mixed in proportions chosen to cause the formation of a coprecipitation gel.

The amounts of the various reagents that are employed are chosen so that the $Na^+$ and $Cl^-$ ions are present in equimolar amounts at the end of the coprecipitation reaction. The saline solution ($Na^+$, $Cl^-$) so formed can by removed simply by carrying out a liquid/solid separation.

Once the coprecipitation has taken place, the gel containing silicon, germanium and metal is recovered, for example, by centrifugation or filtration and subjected to a hydrothermal treatment according to the invention. By recovering the coprecipitation gel in this manner, it is at the same time freed of the $Na^+$ and $Cl^-$ ions, which are particularly harmful for successful crystallization of the mineral particles containing silicon, germanium and metal.

Advantageously and according to the invention, once the coprecipitation gel has been recovered it is washed at least once with water (for example with distilled or osmozed water or with tap water), especially in order to remove all $Na^+$ and $Cl^-$ ions therefrom.

The invention relates also to compositions comprising swelling TOT-TOT interlayer particles obtained by a method according to the invention.

Advantageously and according to the invention, the mineral particles of said compositions all have the same physicochemical entity.

In the present case they are swelling TOT-TOT interlayer particles which are formed by interlayering between:
  at least one non-swelling mineral phase formed by a stack of elementary laminae of the 2/1 phyllogermanosilicate type and having the chemical formula $—(Si_xGe_{1-x})_4M_3O_{10}(OH)_2—$ and
  at least one swelling mineral phase formed by a stack of elementary laminae of the 2/1 phyllogermanosilicate type and at least one interfoliar space between two consecutive elementary laminae; said swelling mineral phase having the chemical formula $—(Si_xGe_{1-x})_4M_{3-\epsilon}O_{10}(OH)_2, (M^{2+})_{\epsilon'}.nH_2O—$.

In particular, a composition according to the invention has a diffractogram, resulting from an X-ray diffraction analysis of said swelling TOT-TOT interlayer particles, having the following characteristic diffraction peaks:
  a plane (001) located at a distance of the order of 14-15 Å, representing said swelling mineral phase,
  planes representing said non-swelling mineral phase:
    a plane (001) located at a distance of the order of 9.60-10.50 Å;
    a plane (020) located at 4.50-4.60 Å;
    a plane (003) located at 3.10-3.20 Å;
    a plane (060) located at 1.50-1.55 Å.

A swelling TOT-TOT interlayer composition according to the invention can be in "crude" form, in which the swelling TOT-TOT interlayer particles are combined with one another to form aggregates. Such a talcose composition can especially be obtained directly from a hydrothermal treatment according to the invention, before it is subjected to a drying and grinding sequence.

A swelling TOT-TOT interlayer composition according to the invention can, likewise and advantageously, be in the form of a pulverulent and dehydrated composition in which the swelling TOT-TOT interlayer particles are individualized. In view of the pulverulent nature of such particles, and owing to their small particle size (from several tens of nanometers to about ten micrometers), they are then advantageously brought into solution for the purpose of preservation until they are used. Within this context, the swelling TOT-TOT interlayer particles of a composition according to the invention are in an individualized form dispersed in a liquid.

In the chemical formulae representing the non-swelling mineral phases and the swelling mineral phases, $—(Si_xGe_{1-x})_4M_3O_{10}(OH)_2—$ and $—(Si_xGe_{1-x})_4M_{3-\epsilon}O_{10}(OH)_2, (M^{2+})_{\epsilon'}.nH_2O—$, of the swelling TOT-TOT interlayer particles that can be prepared according to the invention, Si and Ge refer to the silicon ions and/or germanium ions that occupy the tetrahedral sites of the crystal lattice. M denotes the divalent metal cations of the octahedral sites (for example $Mg^{2+}$, $Co^{2+}$, $Zn^{2+}$, $Cu^{2+}$, $Mn^{2+}$, $Fe^{2+}$, $Ni^{2+}$ and/or $Cr^{2+}$).

Accordingly, as swelling TOT-TOT interlayer compositions within the scope of the invention there may be mentioned by way of specific examples synthetic talc-stevensite interlayer compositions in which the mineral particles form an interlayering between:
  a stack of talc laminae of the formula $—Si_4Mg_3O_{10}(OH)_2—$, which forms the non-swelling mineral phase, and
  a stack of laminae of the stevensite type, of the formula $—(Si_4Mg_{3-\epsilon}O_{10}(OH)_2, (Mg^{2+})_{\epsilon'}.nH_2O—$, which forms the swelling mineral phase.

Likewise, swelling TOT-TOT interlayer compositions within the scope of the invention can also be compositions analogous to a talc-stevensite interlayer composition, for example so-called "germanium-containing" compounds, in which at least some of the $Si^{4+}$ cations of the tetrahedral sites have been substituted by $Ge^{4+}$ cations. Likewise, they can be so-called "derived" or "functionalized" compositions, for example when the $Mg^{2+}$ cations of the octahedral sites have been replaced, in variable proportions, by other divalent cations in order to obtain particles whose physical properties, especially optical and/or electrical and/or magnetic properties, are improved as compared with natural talc particles.

Analyses carried out especially by X-ray diffraction have enabled the inventors to characterize the mineralogical phases of the synthesized particles and confirm that a hydrothermal treatment according to the invention, carried out directly on a silicometallic gel of the chemical formula $—Si_4Mg_3O_{11}, n'H_2O—$ (that is to say a gel containing silicon, germanium and metal of the chemical formula $—(Si_xGe_{1-x})_4M_3O_{11}, n'H_2O—$, in which x is 1 and M denotes magnesium), yields a colloidal composition comprising talc-stevensite interlayer particles.

Moreover, these analyses have demonstrated the influence of the water/solid ratio representative of the reaction mixture based on gel containing silicon, germanium and metal on the proportion of swelling phase in the synthetic mineral that is prepared. For a given hydrothermal treatment temperature and time, the more that ratio increases, the more the portion corresponding to the swelling phase diminishes.

In addition, the inventors have also found, surprisingly, that an anhydrous thermal treatment carried out at a temperature at least greater than 300° C., especially of the order of from 500 to 550° C., and at low pressure (less than 5 bar, especially at atmospheric pressure) allows a synthetic talc-stevensite interlayer composition so prepared to be converted in an extremely simple manner into a stable and pure synthetic talc composition of the chemical formula $—Si_4Mg_3O_{10}(OH)_2—$.

Finally, the inventors have found that this conversion method can be applied generally to all the swelling TOT-TOT interlayer compositions according to the invention (that is to say obtained in a hydrothermal treatment of a gel containing silicon, germanium and metal corresponding to the chemical formula —$(Si_xGe_{1-x})_4M_3O_{11}$,n'$H_2O$—) in order to prepare talcose compositions, that is to say compositions comprising mineral particles of the formula $(Si_xGe_{1-x})_4M_3O_{10}$ $(OH)_2$, which are structurally very similar to a natural talc composition and may exhibit particular properties which have been improved. Such talcose compositions can advantageously replace natural talc compositions in various applications.

Within this context, the invention extends to a method for preparing a composition, that is a talcose composition, comprising synthetic mineral particles which contain silicon, germanium and metal, have a crystalline and lamellar structure, and are of formula —$(Si_xGe_{1-x})_4M_3O_{10}(OH)_2$—, M denoting at least one divalent metal and having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1,$$

x being a real number of the interval [0; 1].

To that end, a composition comprising swelling TOT-TOT interlayer particles according to the invention is subjected to an anhydrous thermal treatment which is carried out at a pressure of less than 5 bar for a period of time and at a treatment temperature, greater than 300° C., which are chosen so as to obtain the crystallinity and stability desired for said synthetic mineral particles containing silicon, germanium and metal that are to be prepared.

Advantageously and according to the invention, said anhydrous thermal treatment is carried out at a temperature of the order of from 500 to 550° C., especially in ambient air and inside a crucible.

The invention relates also to a method for preparing a swelling TOT-TOT interlayer composition, to a swelling TOT-TOT interlayer composition so obtained, to a method for producing a talcose composition, characterized in combination by all or some of the features mentioned hereinabove or hereinbelow.

Figure 3:
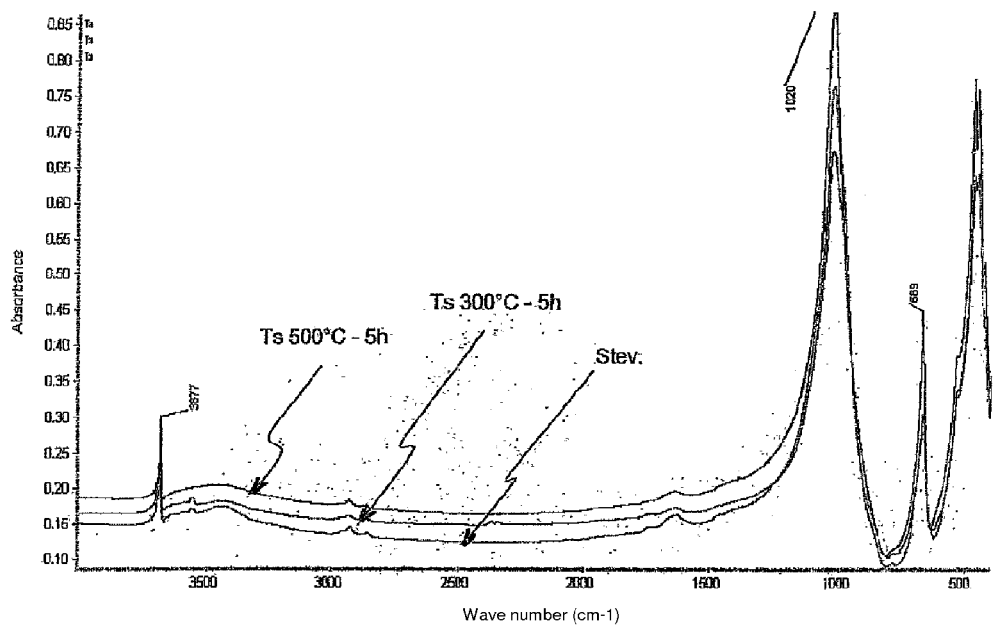
Figure 4A:
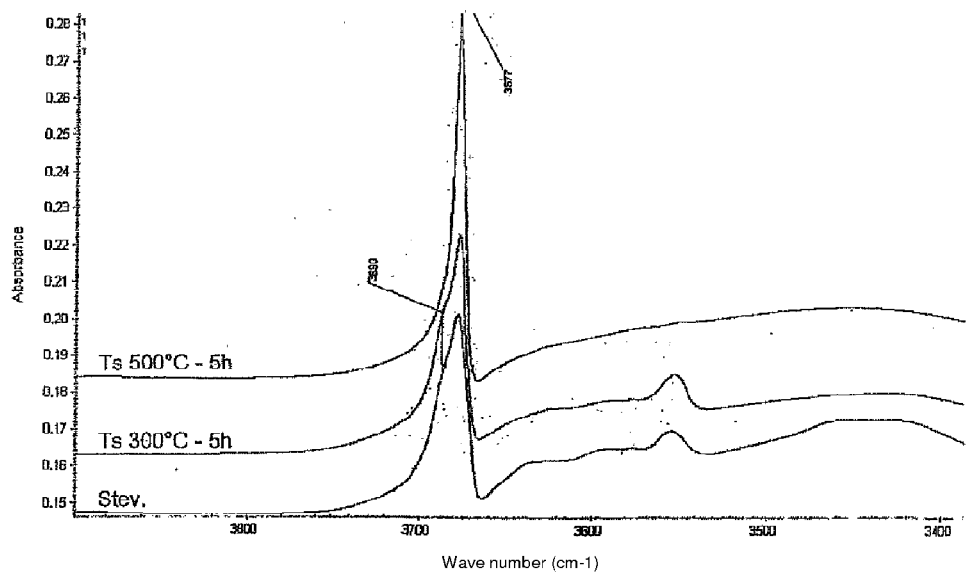
Figure 4B:
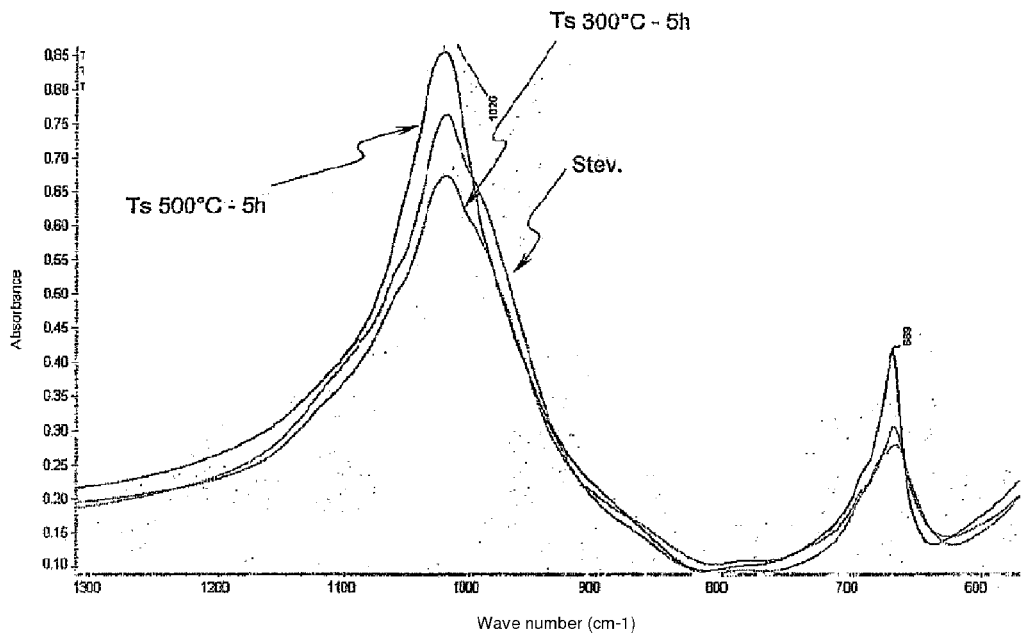
Figure 5:
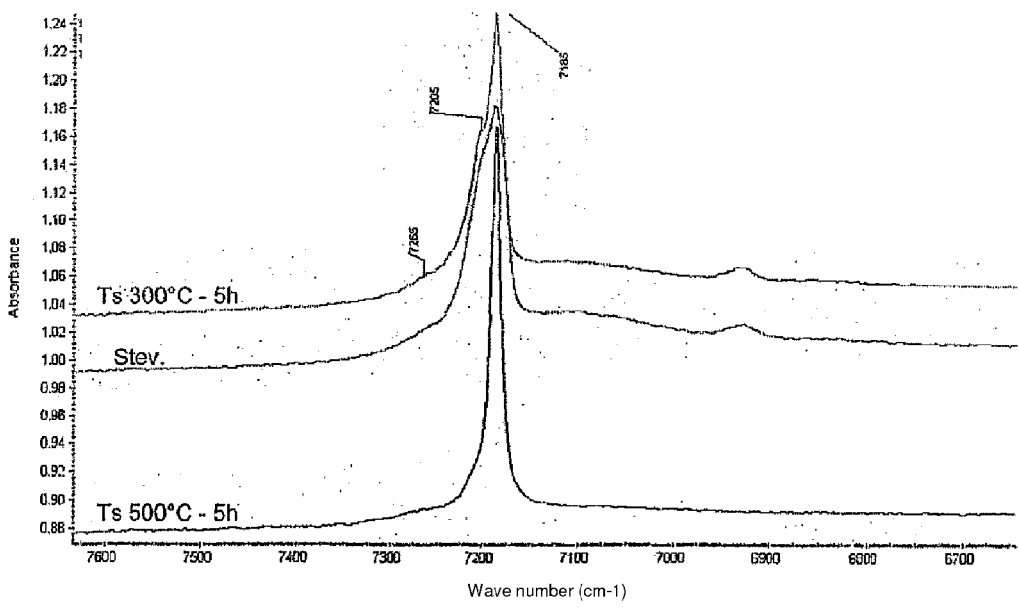
Figure 6:
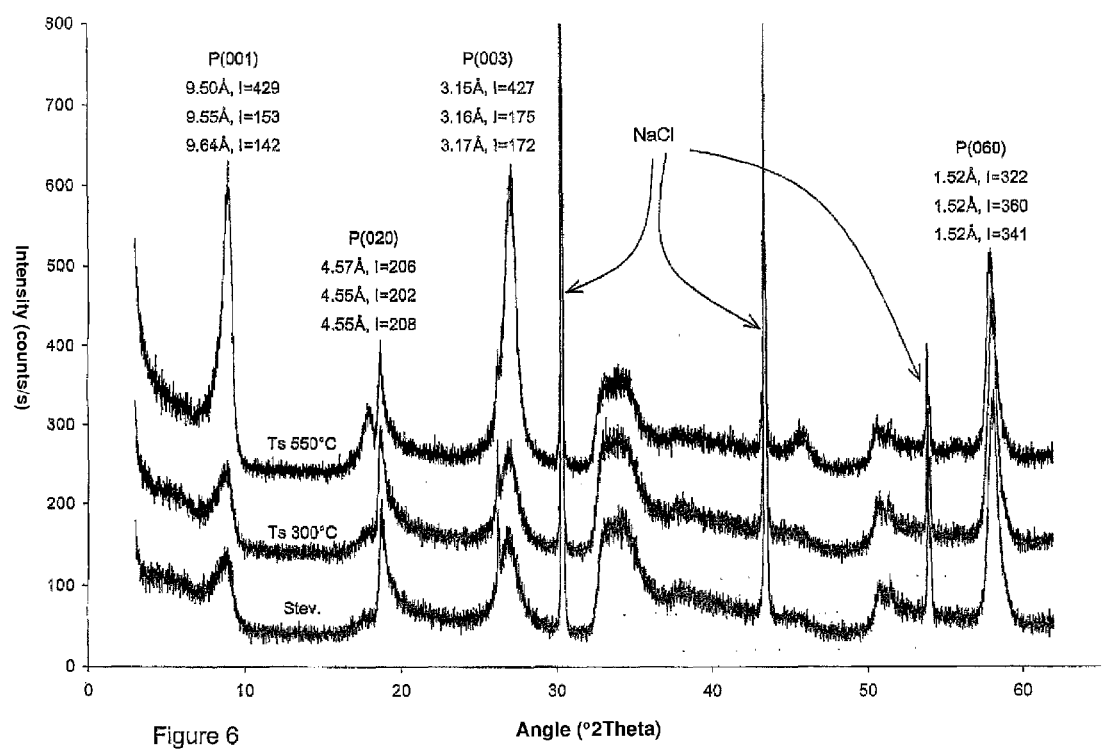
Figure 7:
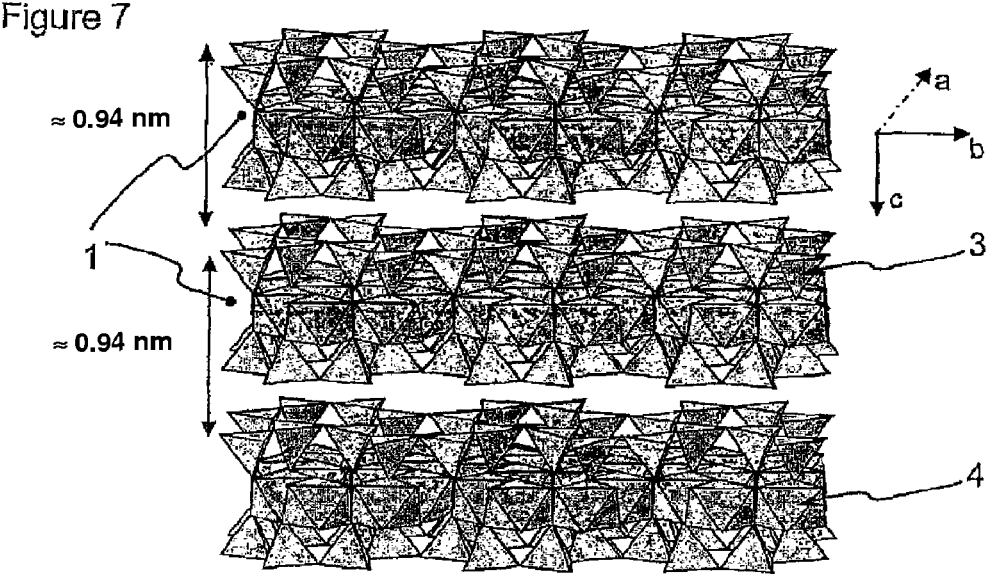
Figure 8:
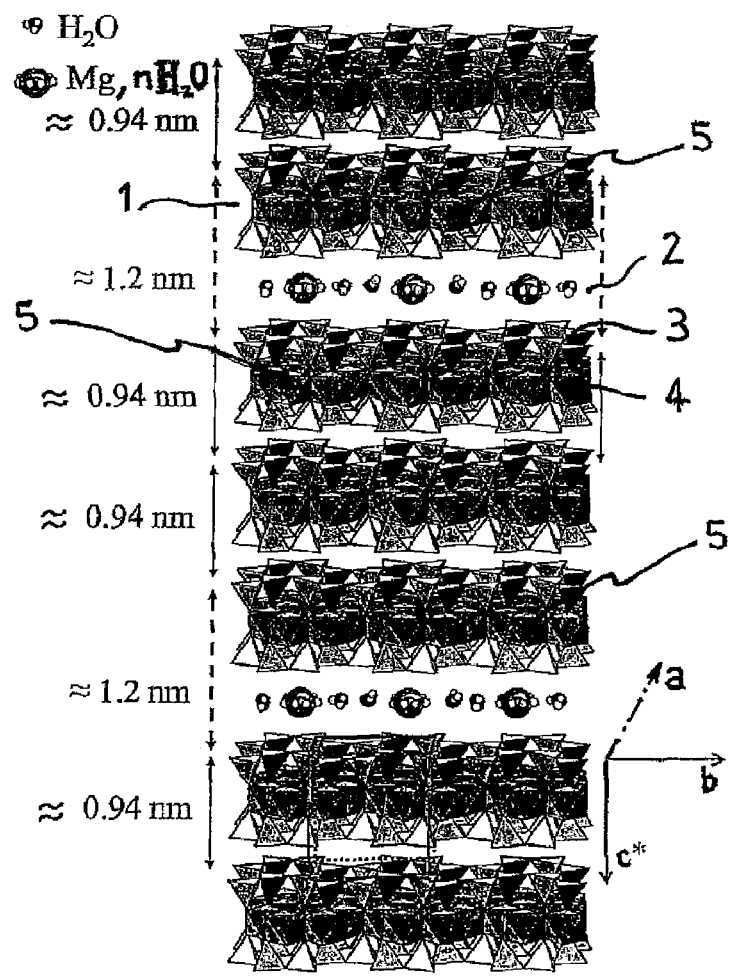

Other objects, advantages and features of the invention will become apparent from reading the description and the examples which follow and which refer to the accompanying figures, in which:

FIG. 1 shows the diffractograms corresponding to the X-ray diffraction analysis carried out on four swelling TOT-TOT interlayer compositions according to the invention prepared with different water/solid ratios in the hydrothermal treatment, FIGS. 2a to 2d correspond to X-ray diffraction analyses carried out on oriented plates saturated with ethylene glycol and calcium, prepared with the above four swelling TOT-TOT interlayer compositions;

FIG. 3 shows three absorption spectra recorded in the mid-infrared range, corresponding to three particular synthetic mineral compositions, FIGS. 4a and 4b correspond to enlargements of the spectra of FIG. 1, carried out in the region of particular zones, FIG. 5 corresponds to absorption spectra recorded in the near-infrared range, showing the conversion of a swelling TOT-TOT interlayer composition according to the invention into a talcose composition by an anhydrous thermal treatment, FIG. 6 shows three diffractograms corresponding to the X-ray diffraction analysis of the mineral compositions of FIGS. 3, 4a, 4b and 5, and confirms the observations thereof, FIGS. 7 and 8 are diagrammatic representations showing, respectively, the crystalline organization of the synthetic talc particles obtained from synthetic talc-stevensite interlayer particles obtained according to the invention, after conversion by an anhydrous thermal treatment according to the invention, and the crystalline organization of the synthetic stevensite particles obtained according to the invention.

A/—GENERAL PROTOCOL FOR SYNTHESIS OF A SWELLING TOT-TOT INTERLAYER COMPOSITION ACCORDING TO THE INVENTION

1/—Preparation of a Gel Containing Silicon, Germanium and Metal

The gel containing silicon, germanium and metal is prepared by coprecipitation according to the following reaction equation:

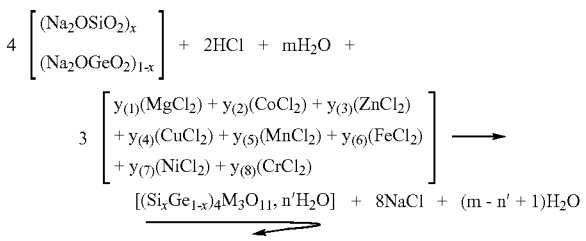

By means of this coprecipitation reaction it is possible to obtain a hydrated gel which contains silicon, germanium and metal and which has the stoichiometry of talc (4 Si/Ge to 3 M). It is carried out starting from:

1. an aqueous solution of penta-hydrated sodium metasilicate or an aqueous solution of sodium metagermanate, or a mixture of these two solutions in the molar ratio x:(1−x),
2. a metal chloride solution prepared with one or more metal salts (in the form of hygroscopic crystals) diluted in distilled water, and
3. a 1N hydrochloric acid solution.

The gel containing silicon, germanium and metal is prepared according to the following protocol:

1. the hydrochloric acid solution and the metal chloride solution are mixed,
2. that mixture is added to the solution of sodium metasilicate and/or metagermanate; the coprecipitation gel forms instantly,
3. the gel is recovered after centrifugation (at 7000 revolutions/minute for 15 minutes) and removal of the supernatant (sodium chloride solution that has formed),
4. the gel is washed with distilled or osmozed water or with tap water (a minimum of two washing/centrifugation cycles are necessary).

At the end of this first phase, a hydrated gel containing silicon, germanium and metal —$(Si_xGe_{1-x})_4M_3O_{11}$,n'$H_2O$— and of gelatinous consistency is obtained. The gel has thixotropic behavior, that is to say it changes from a viscous state to a liquid state when it is stirred and then returns to its initial state if it is allowed to stand for a sufficient period of time.

2/—Hydrothermal Treatment of the Gel Containing Silicon, Germanium and Metal

The gel containing silicon, germanium and metal as obtained hereinbefore is subjected to a hydrothermal treatment at a temperature of from 150° C. to 300° C.

To that end:
1. the gel, in liquefied form, is placed in a reactor (40 ml); the water/solid ratio is optionally adjusted, especially in order to avoid calcination of the solid fraction; in order to avoid any problem of leakage from the reactor, it is filled to ⅔ of its volume,
2. the reactor is placed inside an oven, at the reaction temperature (set at from 150° C. to 300° C.) throughout the treatment.

During the hydrothermal treatment, the gel containing silicon, germanium and metal gradually loses its gelatinous consistency and becomes a particulate solid composition, the crystallinity of which increases with time. This gradual crystallization of the material can be detected by X-ray diffraction analysis and manifests itself in the corresponding diffractograms by the appearance of characteristic peaks which become sharper and intensify throughout the treatment.

At the end of the hydrothermal treatment there is obtained a colloidal talcose composition comprising swelling TOT-TOT interlayer particles in solution in water. At the end of the hydrothermal treatment:
3. the contents of the reactor are filtered in order to recover the solid filtrate therefrom,
4. the filtrate is dried in an oven at 60° C. for one day,
5. once dry, the filtrate is ground in an agate mortar.

There is ultimately obtained a divided solid composition, the color of which is dependent on the nature of the metal chloride(s) used in the preparation of the gel containing silicon, germanium and metal (and also, where appropriate, on the respective proportions of the metal chlorides).

For example, the swelling TOT-TOT interlayer particles of type:
$Si_4Mg_3O_{10}(OH)_2/Si_4Mg_{3-\epsilon}O_{10}(OH)_2, (Mg^{2+})_{\epsilon'} \cdot nH_2O$ are white in color,
$Si_4Ni_3O_{10}(OH)_2/Si_4Ni_{3-\epsilon}O_{10}(OH)_2, (Ni^{2+})_{\epsilon'} \cdot nH_2O$ are green in color,
$Si_4Co_3O_{10}(OH)_2/Si_4Co_{3-\epsilon}O_{10}(OH)_2, (Co^{2+})_{\epsilon'} \cdot nH_2O$ are pink in color,
$Si_4Cu_3O_{10}(OH)_2/Si_4Cu_{3-\epsilon}O_{10}(OH)_2, (Cu^{2+})_{\epsilon'} \cdot nH_2O$ are blue in color,
$Si_4Mn_3O_{10}(OH)_2/Si_4Mn_{3-\epsilon}O_{10}(OH)_2, (Mn^{2+})_{\epsilon'} \cdot nH_2O$ are chocolate in color,
$Si_4Fe_3O_{10}(OH)_2/Si_4Fe_{3-\epsilon}O_{10}(OH)_2, (Fe^{2+})_{\epsilon'} \cdot nH_2O$ are grey to rust in color,
$Si_4Zn_3O_{10}(OH)_2/Si_4Zn_{3-\epsilon}O_{10}(OH)_2, (Zn^{2+})_{\epsilon'} \cdot nH_2O$ are white in color.

B/—STRUCTURAL ANALYSIS AND CHARACTERIZATION

Various swelling TOT-TOT interlayer compositions obtained by following the protocol described above were analyzed especially by X-ray diffraction.

Some of the collected results are presented and discussed hereinbelow. They relate to four particular swelling TOT-TOT interlayer compositions. In the present case, they are talc-stevensite interlayer compositions prepared with a hydrothermal treatment at 220° C., at 16 bar and for 21 days.

The four compositions differ from one another by the water/solid ratios used in the hydrothermal treatment of the silicometallic gels —$Si_4Mg_3O_{11}$,n'$H_2O$—.

The compositions are designated R100, R50, R25 and R10, with reference to the water/solid ratio used (the amount of water being expressed in liters and the amount of solid in kg).

In particular, those ratios were obtained with the following mixtures:
composition R100: 30 ml of water to 300 mg of solid (solid fraction of the gel),
composition R50: 20 ml of water to 400 mg of solid,
composition R25: 20 ml of water to 800 mg of solid,
composition R10: 10 ml of water to 1000 mg of solid.

1/—X-ray Diffraction Analyses

FIG. 1 shows the results of X-ray diffraction analyses carried out on the above four compositions.

The diffractograms were recorded on an XPERT-MPD device (PanAnalytical). The 2θ measurement step is 0.01° with an accumulation time of 2 sec/step. The acceleration voltage is 40 kV and the intensity is 55 mA. The Bragg equation giving the structural equidistance is: $d_{hkl}$=0.7703/sin θ.

The RX diffractograms obtained exhibit, in the planes (020), (003) and (060), diffraction peaks whose positions are very close to those of the characteristic diffraction peaks of a natural talc:
for the plane (020), a peak located at a distance of 4.52-4.55 Å (4.55 Å for natural talc);
for the plane (003), a peak located at 3.14-3.18 Å (3.12 Å for natural talc);
for the plane (060), a peak located at 1.52-1.53 Å (1.53 Å for natural talc).

Regarding the plane (001), the position of the corresponding diffraction peaks is located at a distance varying between 9.71 Å and 10.32 Å. This distance is markedly different from the 9.35 Å which is representative of the plane (001) of a natural talc.

This offsetting of the peak corresponding to the plane (001) as well as the presence of a pointed peak at a distance of the order of 14-15 Å, especially at 14.6 Å, reflects an interlayering of the non-swelling talcose mineral phase with another mineral phase, stevensite, which forms the swelling mineral phase.

This is confirmed on the one hand by the finding that, the larger the relative amount of stevensite in the mineral particles, the greater the offset of the diffraction peak of the plane (001) towards the small diffraction angles. On the other hand, X-ray diffraction analysis was also carried out on oriented plates saturated with ethylene glycol and calcium, in order to confirm the presence of talc-stevensite interlayering.

The oriented plates were prepared according to the following protocol:
1. 15 mg of sample are placed in a 1.25 ml eppendorff, and a 1N $CaCl_2$ solution is added thereto; the mixture is vortexed for about thirty seconds and is then allowed to stand for about one hour,
2. the mixture is centrifuged at 7000 revolutions/minute for 15 minutes, and then the supernatant is removed,
3. the residue is resuspended in a 1N $CaCl_2$ solution; the mixture is vortexed for about thirty seconds and is then allowed to stand for about 12 hours,
4. the mixture is centrifuged at 7000 revolutions/minute for 15 minutes, and then the supernatant is removed,
5. the residue is washed with osmozed water; after addition of the osmozed water, the mixture is vortexed and treated with ultrasound for 10 seconds and is then allowed to stand for about one hour before being centrifuged at 7000 revolutions/minute for 15 minutes in order to remove the supernatant; this washing is repeated 5 times, 6. after washing, the residue, which corresponds to a product saturated with calcium, is taken up in osmozed water, and the mixture is vortexed for 30 seconds and treated with ultrasound for 10 seconds,
7. a sample of the solution so prepared is taken with the aid of a pipette and is deposited on a plate of glass,
8. once the plate has dried, ethylene glycol is sprayed onto it and allowed to act for 5 minutes; the plate is now saturated with calcium and with ethylene glycol and is ready for the analyses.

FIGS. 2a to 2d show the RX diffractograms obtained. Table 1 hereinbelow summarizes the data thereof.

The larger the area of a diffraction peak, the larger the amount of the mineral phase represented by that peak in the sample.

Peaks 1, 2 and 3 indicated in FIGS. 2a to 2d correspond to the stevensite component, to the component that is evidence of interlayering, and to the talc component, respectively. These three components form a talc-stevensite interlayer.

TABLE 1

| | | Position of the peak, $d_{hkl}$ (Å) | Diffraction angle (°2θ) | Intensity of the peak (counts/s) | Area of the peak |
|---|---|---|---|---|---|
| R100 | Peak 1 | 12.12 | 7.290 | 622 | 1.459 |
| | Peak 2 | 10.47 | 8.440 | 1328 | 1.081 |
| | Peak 3 | 9.43 | 9.370 | 3599 | 1.055 |
| R50 | Peak 1 | 18.65 | 4.735 | 4284 | 1.487 |
| | Peak 2 | 9.70 | 9.114 | 3018 | 1.282 |
| | Peak 3 | 9.09 | 9.720 | 4533 | 0.887 |
| R25 | Peak 1 | 18.65 | 4.735 | 10778 | 1.761 |
| | Peak 2 | 9.82 | 8.999 | 2729 | 1.148 |
| | Peak 3 | 9.09 | 9.720 | 7227 | 0.943 |
| R10 | Peak 1 | 18.37 | 4.807 | 22327 | 1.860 |
| | Peak 2 | 9.41 | 9.390 | 6421 | 1.476 |
| | Peak 3 | 9.01 | 9.810 | 6662 | 0.836 |

Likewise, with reference to the RX diffractogram shown in FIG. 1, measurement of the full width at half maximum of the peaks corresponding to the planes (001), (020), (003) and (060), relating to the non-swelling mineral phase, allows the effect of the water/solid ratio on the evolution of crystallinity to be assessed. For a given hydrothermal treatment temperature and time, the crystallinity of the swelling TOT-TOT interlayer particles increases with the water/solid ratio.

C/—GENERAL PROTOCOL FOR THE THERMAL CONVERSION OF SYNTHETIC TALC-STEVENSITE INTERLAYER COMPOSITIONS INTO TALCOSE COMPOSITIONS

A swelling TOT-TOT interlayer composition prepared as taught hereinbefore is subjected, after drying and grinding, to an anhydrous thermal treatment. To that end, the composition is placed in a platinum crucible and is then heated. It is also possible to use a crucible made of ceramics or of any other appropriate material. The reaction is carried out at low pressure, less than 5 bar—especially at atmospheric pressure.

1/—Analysis and Characterization

The crystalline and lamellar structures of the swelling TOT-TOT interlayer particles and those of the talcose particles obtained during and at the end of the implementation of the method defined hereinbefore were characterized by infrared spectroscopy and by X-ray diffraction. Only some of the collected data are presented in FIGS. 3, 4a, 4b, 5 and 6 and discussed hereinbelow.

a) Infrared Analysis

It is known that the characteristic vibration bands of natural talc, in infrared, are as follows (with a resolution of 4 cm$^{-1}$):

3678 cm$^{-1}$: Mg$_3$—OH bond vibration;

1018 cm$^{-1}$: Si—O—Si bond vibration;

669 cm$^{-1}$: Mg—O—Si bond vibration;

7185 cm$^{-1}$: 2vMg$_3$—OH bond vibration.

FIG. 3 shows the results of analyses carried out in the mid-infrared range in transmission on:

a talc-stevensite interlayer composition (I.t.s.) prepared according to the general hydrothermal treatment protocol described above under the following particular conditions: the hydrothermal treatment is carried out at 220° C. for 24 hours with a distilled water/gel ratio of 0.83 (200 g of pulverulent composition to 166 cm$^3$ of water), a first synthetic talc composition (Ts 300° C.—5 h) obtained from the above talc-stevensite interlayer composition (I.t.s.) and with an anhydrous thermal treatment at 300° C. for a period of 5 hours, a second synthetic talc composition (Ts 500° C.—5 h) obtained from the above talc-stevensite interlayer composition (I.t.s.) and with an anhydrous thermal treatment at 500° C. for a period of 5 hours.

The infrared spectra were recorded using a NICOLET 510-FTIR spectrometer over a range of 4000 to 400 cm$^{-1}$.

In addition, FIGS. 4a and 4b show enlargements of the zones in which the vibration bands at 3678 cm$^{-1}$, 1018 cm$^{-1}$ and 669 cm$^{-1}$ are located.

Measurements were also carried out in diffuse reflection in the near-infrared range in order to show the pointed Mg$_3$—OH bond vibration at 7185 cm$^{-1}$. FIG. 5 shows an enlargement of the zone contained between 6000 cm$^{-1}$ and 8000 cm$^{-1}$.

The enlargement of the zone contained between 6000 cm$^{-1}$ and 8000 cm$^{-1}$ (FIG. 3) reveals a peak at 7265 cm$^{-1}$, close to the reference peak at 7185 cm$^{-1}$. The presence of this bond reflects a slight hydration of the product obtained. Water molecules are still intercalated between the laminae of the talc.

These results show that an anhydrous thermal treatment effectively enables the talc-stevensite interlayer composition to be converted into a synthetic talc composition. This conversion manifests itself especially by the presence of the four characteristic vibration bands of talc, the fineness of which substantially reflects the crystallinity of the mineral. The fineness of these four bands, and therefore the crystallinity of the mineral, increases gradually during the anhydrous thermal treatment and with the duration of the treatment (not all the results are shown in the figures).

Nevertheless, with an anhydrous thermal treatment carried out at a temperature of the order of only 300° C., a long time is required to obtain a degree of hydration similar to that of a natural talc.

On the other hand, with an anhydrous thermal treatment at a temperature of the order of 500° C., the treated mineral composition acquires a crystallinity and a degree of hydration that are very comparable with those of a natural talc in a relatively short time (after about 5 hours' treatment).

2/—X-Ray Diffraction Analyses

In X-ray diffraction, natural talc is known to have four characteristic diffraction peaks:
for the plane (001), a peak located at a distance of 9.35 Å;
for the plane (020), a peak located at 4.55 Å;
for the plane (003), a peak located at 3.14 Å;
for the plane (060), a peak located at 1.52 Å.
FIG. 6 shows the results of analyses carried out on:
the above talc-stevensite interlayer composition (I.t.s.),
a first synthetic talc composition (Ts 300° C.) obtained from the above talc-stevensite interlayer composition and with an anhydrous thermal treatment at 300° C. for a period of 5 hours,
a second synthetic talc composition (Ts 550° C.) obtained from the above talc-stevensite interlayer composition and with an anhydrous thermal treatment at 550° C. for a period of 5 hours.

The RX diffractograms, presented in FIG. 6, were recorded using an XPERT-MPD device (PanAnalytical). The 2θ measurement step is 0.01° with an accumulation time of 2 sec/step. The acceleration voltage is 40 kV, the intensity 55 mA. The Bragg equation giving the structural equidistance is: $d_{hkl}=0.7703/\sin\theta$.

These analyses confirm the observations made by infrared spectroscopy.

The characteristic peaks of talc intensify with an anhydrous thermal treatment both at 550° C. and at 300° C., and the intensity increases with the treatment time.

After only 5 hours of an anhydrous thermal treatment at 550° C., the characteristic diffraction peaks of talc sharpen. In particular, the diffraction peak of the plane (001) passes from a position at 9.64 Å to 9.50 Å; this is very close to the value of 9.35 Å characteristic of a natural talc. This difference in values may reflect a very small particle size (nanometric size) and/or slight residual hydration of the synthetic talc, which increases the interreticular distance d(001) owing to the presence of molecules of water intercalated between the laminae of the talc. However, it must be noted that this hydration is less and less pronounced as the anhydrous thermal treatment time becomes longer.

Measurement of the full width at half maximum of the peaks of the planes (001), (020), (003) and (060) shows the evolution of the crystallinity and confirms that, for a treatment temperature greater than 300° C., the longer the synthesis time, the greater the improvement in the crystallinity of the talc (the full width at half maximum diminishes with the treatment time).

The RX diffractograms presented in FIG. 4 also reveal the presence of the characteristic diffraction peaks of sodium chloride (NaCl). The presence of these peaks is evidence of insufficient washing and rinsing of the silicometallic gel prior to the hydrothermal treatment. In the present case, the three compositions analyzed were prepared with only one cycle of washing of the silicometallic gel.

D/—THEORETICAL STRUCTURE OF THE STEVENSITE AND SYNTHETIC TALC PARTICLES OBTAINED ACCORDING TO THE INVENTION

Referring to FIGS. 7 and 8, which show the crystalline structure in diagrammatic form, the talc and the talc-stevensite interlayer obtained according to the invention exhibit a microscopic organization in superposed elementary laminae 1. Each lamina 1 has a crystalline structure composed of a layer of octahedrons 4 occupied by divalent metal cations, in the present case $Mg^{2+}$.

Each of the octahedral layers is intercalated between two layers of tetrahedrons 3.

Compared with talc, the crystalline structure of the talc-stevensite interlayer is characterized by the presence of metal cation voids 5 in the region of some octahedral sites of the elementary laminae 1. These cation voids explain the poor crystallinity observed especially on the RX diffractograms.

Compared with talc, the talc-stevensite interlayer is also characterized by an irregular stack of elementary laminae 1 and by the presence of interfoliar spaces 2 into which the water molecules and the hydrated cations infiltrate. These cations which have infiltrated into the interfoliar spaces 2 allow the loss of charge due to the cation voids 5 in the mineral phase to be compensated for. The crystal edifice thus remains in a relatively neutral state.

The interfoliar cations are bonded weakly to the remainder of the lattice and are accordingly capable of being exchanged with other cations. Likewise, the interfoliar spaces 2 are more or less expansible. Various substances can be introduced into the interfoliar spaces.

For example, like smectites, talc-stevensite interlayer compositions according to the present invention are particularly valuable in agriculture. In particular, the incorporation of fertilizing agents—in particular of mineral salts (potassium, nitrogen, etc.)—into the interfoliar spaces of their particles can be envisaged. Such talc-stevensite interlayer particles can then be used as vectors for the introduced substances and will permit sustained release thereof in the ground.

The anhydrous thermal treatment tests on the talc-stevensite interlayer particles resulted in the conversion of that synthetic mineral into talc. In particular, a gradual sharpening of the characteristic RX diffraction peaks in the region of the planes (001), (020), (003) and (060) is observed, which reflects an improvement in the crystallinity of the laminae 1. Gradually, the voids 5 are filled with the cations of the interfoliar spaces 2. And, concomitantly, the interfoliar spaces become smaller (passing from 12 Å to values of the order of 9.4-9.6 Å); in the plane (001), the characteristic diffraction peak is close to the distance 9.35 Å.

The invention claimed is:

1. A method for preparing a composition comprising mineral particles, that is swelling TOT-TOT interlayer particles, formed by interlayering between:
at least one non-swelling mineral phase formed by a stack of elementary laminae of the 2/1 phyllogermanosilicate type and having the chemical formula —$(Si_xGe_{1-x})_4 M_3O_{10}(OH)_2$— and
at least one swelling mineral phase formed by a stack of elementary laminae of the 2/1 phyllogermanosilicate type and at least one interfoliar space between two consecutive elementary laminae; said swelling mineral phase having the chemical formula —$(Si_xGe_{1-x})_4M_{3-\epsilon} O_{10}(OH)_2, (M^{2+})_{\epsilon'}\cdot nH_2O$—,
in which chemical formulae:
M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1,$$

x is a real number of the interval [0; 1],
$\epsilon$ and $\epsilon'$ relate to the cation deficit of the elementary laminae of the swelling phase and to the cations present in the interfoliar space(s), respectively, said composition having an X-ray diffractogram comprising the following characteristic diffraction peaks:
a plane (001) located at a distance of the order of 14-15 Å, representing said swelling mineral phase,
planes representing said non-swelling mineral phase:
a plane (001) located at a distance of the order of 9.60-10.50 Å;
a plane (020) located at 4.50-4.60 Å;
a plane (003) located at 3.10-3.20 Å;
a plane (060) located at 1.50-1.55 Å,
which method comprises subjecting a gel containing silicon, germanium and metal and having the chemical formula —$(Si_xGe_{1-x})_4M_3O_{11}$,n'$H_2O$—, in the liquid state, to a hydrothermal treatment; said hydrothermal treatment is carried out for a period of time and at a temperature, of from 150° C. to 300° C., which are chosen according to the structural characteristics desired for said swelling TOT-TOT interlayer particles that are to be prepared; said hydrothermal treatment is carried out at a controlled pressure of the order of 16 bar and with stirring; for a given hydrothermal treatment temperature and time, additional water is added to said gel containing silicon, germanium and silicate in order to adjust the water/solid ratio representative of the reaction mixture based on gel containing silicon, germanium and metal that is to be treated, in dependence on the ratio by volume —swelling mineral phase/non-swelling mineral phase—desired for the swelling TOT-TOT interlayer particles that are to be prepared.

2. The method as claimed in claim 1, wherein, at the end of said hydrothermal treatment, a colloidal composition is recovered and said colloidal composition is subjected to a drying step followed by a step of mechanical grinding to give a solid composition comprising individualized swelling TOT-TOT interlayer particles.

3. The method as claimed in claim 2, wherein said gel containing silicon, germanium and metal is prepared by a coprecipitation reaction between:
a liquid composition comprising at least one saline solution selected from: a sodium metasilicate ($Na_2OSiO_2$) solution and a sodium metagermanate ($Na_2OGeO_2$) solution and having the following molar concentration ratios:

$$\frac{[Na_2OSiO_2]}{[Na_2OSiO_2]+[Na_2OGeO_2]} = x \text{ and}$$

$$\frac{[Na_2OGeO_2]}{[Na_2OSiO_2]+[Na_2OGeO_2]} = 1-x; \text{ and}$$

a solution of metal chloride(s) ($MCl_2$) comprising at least one divalent metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); with a molar concentration ratio for each of said metal chlorides such that:

$$\frac{[\text{divalent } metal_{(i)}]}{[M]_{(total)}} = y(i)$$

in the presence of a hydrochloric acid solution.

4. The method as claimed in claim 1, wherein said gel containing silicon, germanium and metal is prepared by a coprecipitation reaction between:
a liquid composition comprising at least one saline solution selected from: a sodium metasilicate ($Na_2OSiO_2$) solution and a sodium metagermanate ($Na_2OGeO_2$) solution and having the following molar concentration ratios:

$$\frac{[Na_2OSiO_2]}{[Na_2OSiO_2]+[Na_2OGeO_2]} = x \text{ and}$$

$$\frac{[Na_2OGeO_2]}{[Na_2OSiO_2]+[Na_2OGeO_2]} = 1-x; \text{ and}$$

a solution of metal chloride(s) ($MCl_2$) comprising at least one divalent metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); with a molar concentration ratio for each of said metal chlorides such that:

$$\frac{[\text{divalent } metal_{(i)}]}{[M]_{(total)}} = y(i)$$

in the presence of a hydrochloric acid solution.

5. The method as claimed in claim 1, wherein the hydrothermal treatment of said gel containing silicon, germanium and metal is carried out by means of an autoclave.

6. The method as claimed in claim 1, wherein said hydrothermal treatment is carried out at a temperature of the order of 220° C. for a period of the order of 15 days.

7. The method as claimed in claim 1, wherein said hydrothermal treatment is carried out at a temperature of the order of 300° C. for a period of the order of 5 hours.

8. The method as claimed in claim 1, wherein, in order to prepare said gel containing silicon, germanium and metal of formula $(Si_xGe_{1-x})_4M_3O_{11}$, n'$H_2O$, the following steps are carried out in succession:
an acidic composition of metal chloride is prepared by dissolving, in one volume of water, an appropriate amount of a composition of hygroscopic crystals of at least one metal chloride selected from: magnesium chloride ($MgCl_2$), nickel chloride ($NiCl_2$), cobalt chloride ($CoCl_2$), zinc chloride ($ZnCl_2$), copper chloride ($CuCl_2$), manganese chloride ($MnCl_2$), iron chloride ($FeCl_2$), chromium chloride ($CrCl_2$); then hydrochloric acid (HCl) is added thereto;
a liquid composition is prepared by dissolving, in an appropriate volume of water, an amount of at least one salt selected from: sodium metasilicate and sodium metagermanate;
the two aqueous compositions are mixed in proportions chosen to cause the formation of a coprecipitation gel;
the amounts of the various reagents that are employed being chosen so that the $Na^+$ and $Cl^-$ ions are present in equimolar amounts at the end of the coprecipitation reaction.

9. The method as claimed in claim 8, wherein, before the hydrothermal treatment of said gel containing silicon, germanium and metal is carried out, said gel is washed with water in order to remove therefrom the sodium chloride formed in the coprecipitation reaction.

10. A composition comprising mineral particles, that is swelling TOT-TOT interlayer particles, formed by interlayering between:
at least one non-swelling mineral phase formed by a stack of elementary laminae of the 2/1 phyllogermanosilicate type and having the chemical formula —$(Si_xGe_{1-x})_4M_3O_{10}(OH)_2$— and at least one swelling mineral phase formed by a stack of elementary laminae of the 2/1 phyllogermanosilicate type and at least one interfoliar space between two consecutive laminae; said swelling mineral phase having the chemical formula —$(Si_xGe_{1-x})_4M_{3-\epsilon}O_{10}(OH)_2$, $(M^{2+})_{\epsilon'}\cdot nH_2O$—, in which chemical formulae:

M denotes at least one divalent metal and has the formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1,$$

x is a real number of the interval [0; 1], $\epsilon$ and $\epsilon'$ relate to the cation deficit of the elementary laminae of the swelling phase and to the cations present in the interfoliar space(s), respectively, said composition being characterized in that an X-ray diffraction analysis of said swelling TOT-TOT interlayer particles yields a diffractogram having the following characteristic diffraction peaks:

a plane (001) located at a distance of the order of 14-15 Å, representing said swelling mineral phase, planes representing said non-swelling mineral phase:

a plane (001) located at a distance of the order of 9.60-10.50 Å;

a plane (020) located at 4.50-4.60 Å;

a plane (003) located at 3.10-3.20 Å;

a plane (060) located at 1.50-1.55 Å.

11. The composition as claimed in claim 10, wherein said swelling TOT-TOT interlayer particles are present in individualized and pulverulent form.

12. A method for preparing a composition, that is a talcose composition, comprising synthetic mineral particles which contain silicon, germanium and metal, have a crystalline and lamellar structure, and are of formula —$(Si_xGe_{1-x})_4M_3O_{10}(OH)_2$—, M denoting at least one divalent metal and having the chemical formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1,$$

x being a real number of the interval [0; 1], which process comprises subjecting a composition comprising swelling TOT-TOT interlayer particles according to claim 11 to an anhydrous thermal treatment which is carried out at a pressure of less than 5 bar for a period and at a treatment temperature, greater than 300° C., which are chosen in order to obtain the crystallinity and stability desired for said synthetic mineral particles containing silicon, germanium and metal that are to be prepared.

13. The composition as claimed in claim 10, wherein said swelling TOT-TOT interlayer particles are combined with one another to form aggregates.

14. A method for preparing a composition, that is a talcose composition, comprising synthetic mineral particles which contain silicon, germanium and metal, have a crystalline and lamellar structure, and are of formula —$(Si_xGe_{1-x})_4M_3O_{10}(OH)_2$—, M denoting at least one divalent metal and having the chemical formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1,$$

x being a real number of the interval [0; 1], which process comprises subjecting a composition comprising swelling TOT-TOT interlayer particles according to claim 13 to an anhydrous thermal treatment which is carried out at a pressure of less than 5 bar for a period and at a treatment temperature, greater than 300°, which are chosen in order to obtain the crystallinity and stability desired for said synthetic mineral particles containing silicon, germanium and metal that are to be prepared.

15. A method for preparing a composition, that is a talcose composition, comprising synthetic mineral particles which contain silicon, germanium and metal, have a crystalline and lamellar structure, and are of formula —$(Si_xGe_{1-x})_4M_3O_{10}(OH)_2$—, M denoting at least one divalent metal and having the chemical formula $Mg_{y(1)}Co_{y(2)}Zn_{y(3)}Cu_{y(4)}Mn_{y(5)}Fe_{y(6)}Ni_{y(7)}Cr_{y(8)}$; each $y(i)$ representing a real number of the interval [0; 1], such that $$\sum_{i=1}^{8} y(i) = 1,$$

x being a real number of the interval [0; 1], which process comprises subjecting a composition comprising swelling TOT-TOT interlayer particles according to claim 10 to an anhydrous thermal treatment which is carried out at a pressure of less than 5 bar for a period and at a treatment temperature, greater than 300° C., which are chosen in order to obtain the crystallinity and stability desired for said synthetic mineral particles containing silicon, germanium and metal that are to be prepared.

16. The method as claimed in claim 15, wherein said anhydrous thermal treatment is carried out at a temperature of the order of from 500 to 550° C.

17. The method as claimed in claim 16, wherein said anhydrous thermal treatment is carried out in ambient air, inside a crucible.

18. The method as claimed in claim 15, wherein said anhydrous thermal treatment is carried out in ambient air, inside a crucible.

* * * * *